Patented Jan. 1, 1952

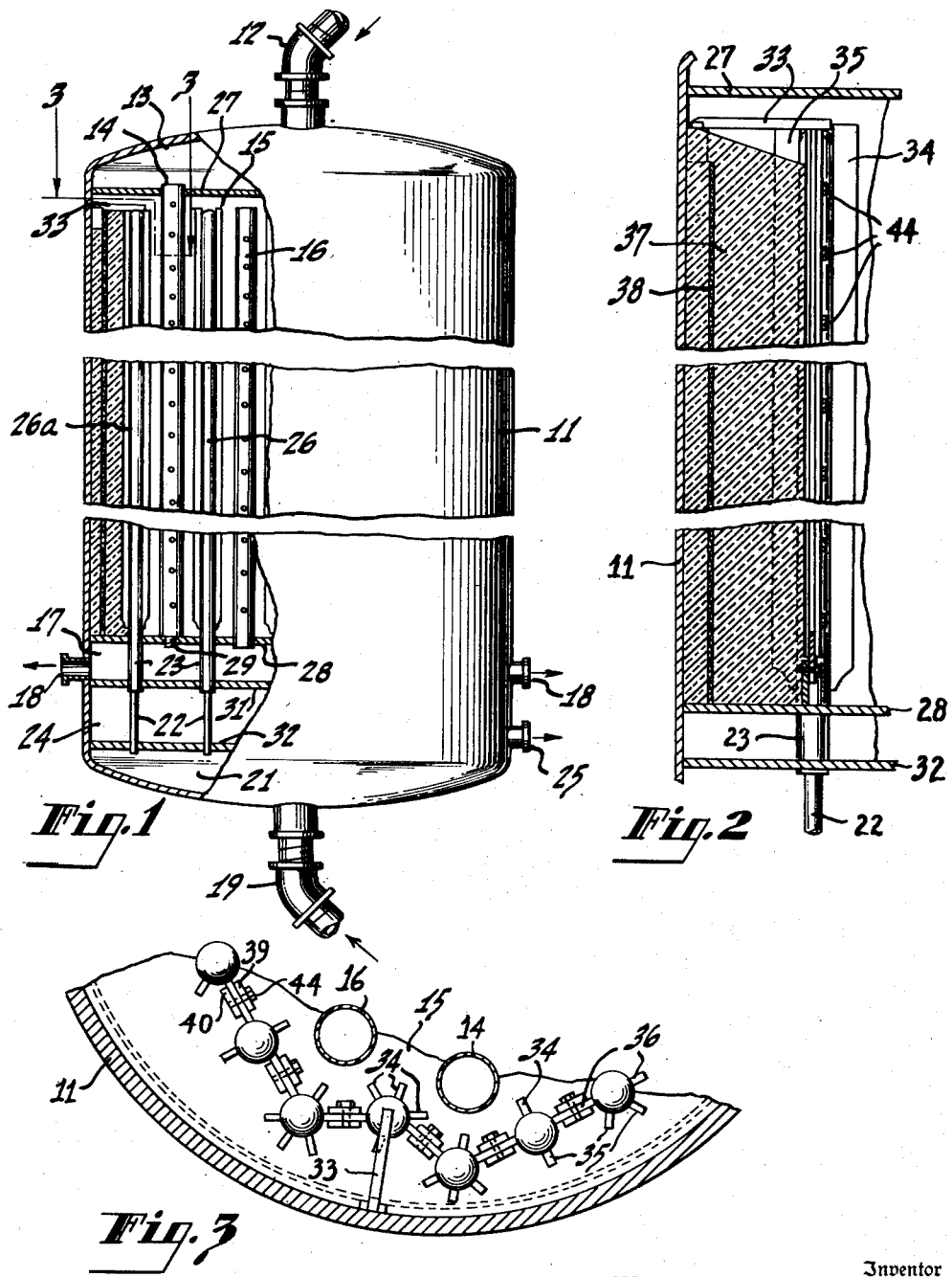

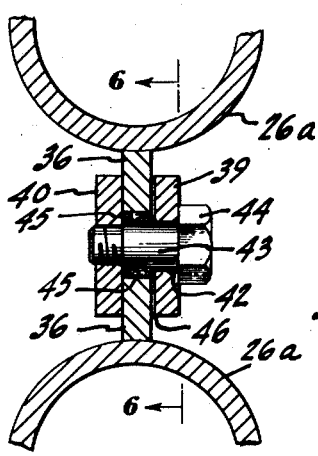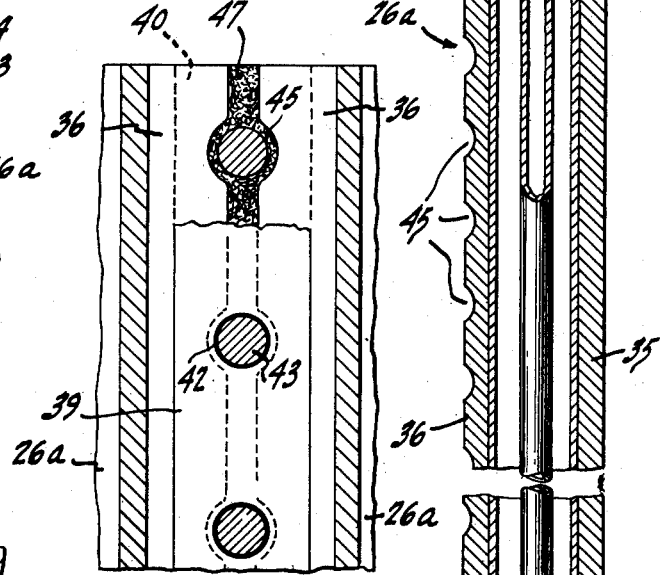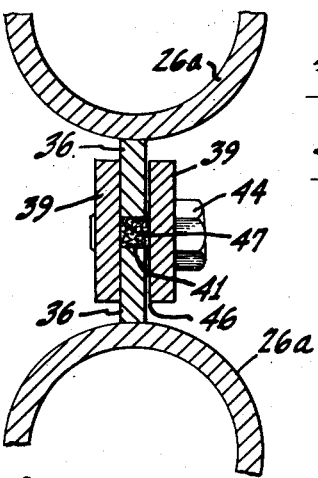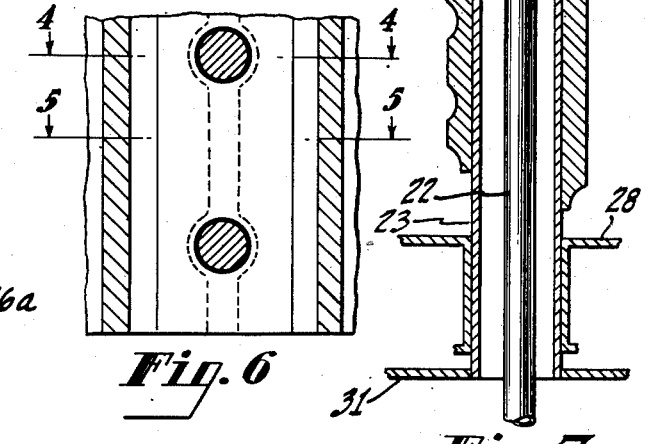

2,580,470

UNITED STATES PATENT OFFICE 2,580,470

APPARATUS FOR CONTACT TREATMENT OF MATERIALS

Robert M. Shirk, Wilmington, Del., assignor to Houdry Process Corporation, Wilmington, Del., a corporation of Delaware Application January 21, 1950, Serial No. 139,850

5 Claims. (Cl. 23—288)

This invention relates in general to apparatus for treating fluids in the presence of a static mass of contact material, and particularly to converters in which a mass of subdivided solid contact material may alternately be contacted by fluid reactants to effect a chemical conversion thereof, and by regeneration fluids to recondition or reactivate the contact mass for further use, the converters having perforated conduits embedded in the contact mass for distributing the reactants within the mass and for subsequently removing the gaseous products of reaction.

The invention is in the nature of an improvement in converters for effecting either exothermic or endothermic chemical reactions, such as those disclosed in the patents to Prickett, No. 2,092,017, dated September 7, 1937, Houdry et al., No. 2,283,208, dated May 19, 1942, and Raymond C. Lassiat et al., No. 2,547,021, dated April 3, 1951.

Because of the relatively high temperatures employed and the wide fluctuations in temperature between successive treating steps, efficient operation of such converters necessitates a careful control of temperature in order to maintain the contact mass within the temperature range of the reactions. The problem of adequate control is complicated by the fact that such converters are normally of relatively large cross-section area, and are so shaped that an arrangement of embedded conduits or tubes which will provide an equal volume of contact mass per conduit around all the conduits is virtually impossible. In view of this fact, it is difficult to maintain uniformity of temperature throughout the entire cross-section of the contact mass, and especially in the marginal portion thereof. It has been found that the absence of reasonable temperature control may result in unsatisfactory conditions for the conversion of the reactants or for treatment of the contact materials within localized areas of the converter, and in some cases in actual physical damage to or destruction of portions of the internal apparatus.

In order to alleviate the foregoing problem, it has been a common practice to employ various devices for effecting satisfactory heat control, such as internal tubes disposed within the contact mass through which a fluid heat exchange medium may circulate in indirect heat exchange with the materials within the converter, extended surface devices integrally attached to the outer surface of the tubes in order to obtain higher heat transfer rates, external jacketing means for temperature control of the outer vessel wall, and internal insulation of the converter casing.

In connection with the last-mentioned expedient for maintaining temperature control in the region adjacent to the periphery of the converter casing, it has heretofore been proposed, as indicated by the aforementioned disclosures, to provide an inner shell within the converter casing, surrounding the tube assembly and spaced from the casing wall. The shell is maintained in fixed relation to the casing by suitable supporting means secured to the latter, the arrangement being adapted to allow for differential contraction and expansion between the shell and the portions of the apparatus as a result of temperature changes within the casing. The shell is usually shaped in approximate conformity with the outer contour of the tube bundle, and the space between the shell and the casing is filled with a suitable filler of insulating material in order to reduce the effect of outside temperature conditions on the contact material occupying the space within the shell and surrounding the various tubes.

It has been a practice to dispose the various perforated inlet and outlet conduits and the conduits for conducting a fluid heat exchange medium in indirect heat exchange with the mass of contact material in a symmetrical pattern within the converter casing. The chosen pattern or arrangement of conduits to be embedded in the contact mass will seldom, if ever, match the internal contour of a conventional casing, however, so that it is, as a practical matter, impossible to obtain an arrangement which will provide an equal volume of contact mass per conduit around all of the conduits. Such arrangement is, of course, readily obtainable in the inner or central region of the tube pattern, but in the marginal portion there will necessarily be conduits partly surrounded by fractional quantities of contact mass, relative to the normal amount thereof distributed about the numerous tubes in the inner region of the tube pattern. Conventional practice has been to supply to such marginal conduits a fluid movement proportional to the fractional quantity of contact mass the tubes are intended to serve. Despite such arrangements, serious difficulties have been encountered by reason of non-uniformity of temperature in the peripheral region of the tube bundle. One of the expedients resorted to in order to achieve a uniform temperature in the marginal region has been the introduction of a suitable subdivided solid material, such as Corhart grain, as a packing in the space behind the peripheral distributing and collecting tubes. An additional expedient has been the omission from the symmetrical tube pattern of a certain number of the peripheral distributing and collecting tubes. Despite these precautions, however, there have been instances of burned out jackets, necessitating long and costly shut-downs of the equipment in order to make the necessary repairs. A further difficulty encountered in the foregoing arrangement has been the damaging effect of Corhart fines, carried from the converter case in the outgoing flue gas stream, upon equipment used in connection with the converter, such as the conventional turbo-compressor.

In accordance with the present invention the above-recited difficulties are in large part obviated by a tube arrangement in which all distributing and collecting tubes are omitted from the case periphery, leaving a marginal area comprising an uninterrupted outer row of heat exchange tubes. Consequently, the need for a protective packing of Corhart grain or similar material in portions of the tube bundle periphery is eliminated, and the contact mass may therefore consist entirely of catalyst. The elimination of any inert fill in the contact mass permits the use of air tubes of increased diameter. The heat exchange or control tubes of the present invention are provided with extended surfaces preferably in the form of longitudinal fins of rectangular cross-section. The fins of the heat exchange tubes in the outer peripheral ring are so arranged that a fin of one tube is alined with a fin of the next adjacent tube, the alined fins being situated on the line of centers. The adjacent alined fins of adjacent tubes in the outer ring are slightly spaced and are connected by connecting devices in a manner which will permit independent longitudinal movement of the tubes as a result of unequal expansion or contraction during periods of temperature change. The peripheral ring of connected heat exchange tubes forms, in effect, a shell separating the insulation jacket from the mass of contact material, thus eliminating the necessity for the usual sheet-metal shell enveloping the tube bundle. Whereas catalyst-retaining shells of the type illustrated in the aforementioned patents are subject to overheating in localized areas behind the marginal air tubes, the catalyst containing ring of connected heat exchange tubes of the present invention is characterized by a substantial uniformity of temperature throughout. By providing a marginal barrier in which there is a substantially uniform transfer of heat, and which is provided with connecting means for accommodating any tendency for unequal expansion or contraction as a result of temperature change, the need for periodically repairing or replacing warped, buckled, or burned-out jackets has been substantially eliminated.

Behind the barrier of heat exchange tubes, in the space between the barrier and the outer casing, the usual insulation lining is provided. The insulation may comprise a loose fill of commercially available material, or it may be a solid lining comprising either an assemblage of preformed sections suitably supported from the casing wall or a suitable mixture poured within the space while still in a soft state and permitted to set. In the latter case, the cementitious material may have an embedded reenforcement of wire rods or mesh to increase its stability.

For a fuller understanding of the invention, reference may be had to the following description of an embodiment of the invention taken in connection with the accompanying drawings forming a part of this application, in which:

Fig. 1 is an elevational view of a fixed-bed cracking case for the catalytic cracking of hydrocarbons, with a portion broken away to clearly show the inner construction;

Fig. 2 is an enlarged fragmentary section of a portion of the casing wall showing the construction of the insulation jacket and the peripheral heat exchange tubes;

Fig. 3 is a fragmentary enlarged horizontal section taken along the line 3—3 of Fig. 1 and showing the disposition of the peripheral heat exchange tubes and their connecting devices;

Fig. 4 is an enlarged fragmentary view showing in horizontal section one of the devices connecting the alined fins of adjacent peripheral heat exchange tubes;

Fig. 5 is a view similar to that of Fig. 4, but showing a horizontal section taken at a point between connecting elements;

Fig. 6 is a sectional elevation taken along the line 6—6 of Fig. 4.

Fig. 7 is an enlarged sectional elevation of one of the heat exchange tubes in the peripheral row.

Referring to the drawings, Fig. 1 shows a converter or reaction vessel comprising an outer casing 11 containing the conversion zone. Fluid to be converted enters the converter through pipe 12. The fluid reactants are received in an upper distributing chamber 13 from which they are passed downwardly through fluid distributing tubes 14, and outwardly through side wall perforations therein into a suitable contact mass maintained as a fixed bed in the region 15 surrounding the tubes. The gaseous products of conversion then pass out of the region 15 through perforations in the side walls of fluid collecting tubes 16, which discharge into collecting chamber 17, and are removed from the vessel through pipes 18.

A suitable heat control medium, such as molten salt, enters the reaction vessel through pipe 19 discharging into a lower distributing chamber 21. From chamber 21 the heat exchange medium passes upwardly through pipe lines 22 and then downwardly through pipe lines 23, concentrically surrounding the pipe lines 22, discharging into collecting chamber 24 and being discharged therefrom through pipe 25. Tubes 22 and their associated encasing tubes 23 comprise heat control units 26, generally referred to as salt tubes, which are distributed in a uniform pattern throughout the tube bundle in order to control the temperature within the contact mass. The peripheral row of salt tubes 26a are joined together to form a shell-like barrier separating the contact mass from the insulation jacket. Since the heat transfer requirements of the peripheral tubes are different from the requirements of the tubes in the inner region of the tube bundle, the peripheral tubes may, if desired, be constructed differently from the inner tubes to allow for the difference in heat transfer.

Referring to Figs. 1 and 2, casing 11 is provided with internal tube sheets adapted to rigidly support the various tubes in proper spaced relation, and to provide partitioning means for separating the interior of the casing 11 into suitable confined zones for carrying out the desired reaction and for collecting and distributing gaseous reactants and reaction products. The major portion of the casing interior comprises the reaction zone which is defined at its upper and lower ends by tube sheets 27 and 28 respectively. Upper tube sheet 27 separates the reaction zone 15 from the distributing chamber 13, and lower tube sheet 28 separates the reaction zone from collecting chamber 17. The upper ends of distributing tubes 14 and the lower ends of collecting tubes 16 are set in tube sheets 27 and 28 respectively, and the opposite ends of tubes 14 and 16 are provided with plug members 29 which close the ends of the tubes and are threaded into the tube sheets 27 and 28.

The space within the casing 11 below tube sheet 28 is further subdivided by tube sheets 31 and 32. Tube sheets 28 and 31 and the casing wall define the collecting chamber 17, into which the gaseous products of reaction are discharged from collecting tubes 16. The outer tubular elements 23 of salt tubes 26 and 26a pass through openings in tube sheet 28 and have their ends set in tube sheet 31. The open lower ends of tubes 23 communicate with chamber 24, defined by tube sheets 31 and 32 and the casing wall. The inner tubular elements 22 of salt tubes 26 and 26a have their open lower ends set in tube sheet 32, which with the lower end of the casing defines the distributing chamber 21. The salt tubes 26 and 26a extend upwardly within the reaction zone 15 to a point near the upper tube sheet 27. During normal operation, lateral displacement of the upper ends of the salt tubes is prevented by the presence of the contact mass which is packed in the spaces around and between the various tubes. Additional support may be provided, however, for some or all of the tubes 26a in the peripheral row by means of a bracket member 33 secured at one end to the casing wall and arranged at the opposite end to hold the upper end of tube 26a in its proper position.

Extended surface elements, or fins, are provided for all the heat exchange tubes in the tube bundle, so as to increase the rate of heat transfer between the contact mass and the heat exchange fluid. Preferably, such fins comprise elongated members of rectangular cross-section longitudinally coextensive with and continuously bonded along one edge to the outer surface of the tube, and extending radially outwardly therefrom. Within the interior portion of the tube bundle the number and disposition of fins on the tubes is preferably uniform because of the substantially identical duty requirements of these inner tubes. As previously mentioned, however, peripheral tubes 26a have only a fractional portion of the duty requirement of the more centrally located tubes, so that the fin arrangement may be modified accordingly. Preferably, all of the fins, except those in the peripheral row which are joined by connecting devices, are of similar shape. The alined fins of tubes 26a are of special form as shown in Fig. 7, to permit cooperative engagement with the connecting devices.

As clearly shown in Fig. 3, certain of the fins on the peripheral row of control tubes 26a extend inwardly into the mass of contact material. These fins are designated by the reference numeral 34. Other fins 35 on the tubes 26a extend outwardly into the space between the peripheral row of tubes and the casing wall, and still other fins 36 are disposed on the line of centers between adjacent tubes in the peripheral row and are provided with connecting devices, illustrated in Figs. 4, 5, and 6, for joining the tubes 26a into a continuous wall-like enclosure surrounding the remaining tubes of the bundle. The space between the ring of connected peripheral tubes 26a and the casing wall is filled with a suitable insulation material 37, which may be suitably reinforced in conventional manner by embedding therein a suitable frame-work 38 of reinforcing members in the form of rods, wire mesh, or the like. It may be seen from Figs. 2 and 3 that the insulation material completely embeds the outwardly projecting fins 35, as well as a substantial portion of the tubes 26a, so that there is thus created a continuous salt-cooled jacket around the tube bundle.

Referring to Figs. 4, 5, and 6, the connecting device for joining the alined fins 36 of adjacent peripheral cooling tubes 26a is clearly shown as comprising a pair of elongated plate members 39 and 40 adapted to be placed on either side of the pair of alined fins 36 so as to completely cover the gap 41 therebetween. Plate member 39 is provided with spaced openings 42 along its longitudinal axis adapted to receive the unthreaded portion 43 of a set-screw 44. The outer edges of fins 36 are provided with indented portions 45 adapted to permit the free passage of portion 42 of the set-screw through the gap 41 between the alined fins 36. Plate member 40 is provided with threaded openings in alinement with the openings 42 of plate member 39 adapted to receive the threaded end of set-screw 44. The unthreaded portion 43 is of slightly greater length than the combined thickness of fin 36 and plate member 39, so that when the set-screw 44 is drawn up tight a slight amount of free play will be provided in the connection, as illustrated by the gap 46. Fig. 4 shows a section of the connecting device between adjacent set-screws 44. The gap portion 41 between adjacent set-screws may be filled with a packing material 47, which may be asbestos tape or any other suitable material capable of sealing the joint against an accumulation therein of fine particles of the contact mass. The connecting device thus joins the peripheral row of control tubes 26a into a unitary shell-like barrier, each tubular element of which is free to move independently of the other tubes, so as to adjust itself to any strains or stresses resulting from expansion or contraction during temperature changes, or resulting from other causes. With the tubes 26, the non-rigid sealed connection thus provides a continuous, relatively flexible and relatively non-permeable container for the contact material which eliminates the continuous rigid shell of plate material heretofore usually provided as a container for the contact mass. The contact mass container of the present invention differs materially from the containers heretofore employed in that it is provided at uniformly spaced points about the periphery with integral passages for control fluid which extend longitudinally the full length of the container and serve to maintain a substantially uniform temperature in the marginal region of the contact mass. The efficient arrangement thus provided has been effective in overcoming one of the principal faults to be found in constructions heretofore employed, in that it eliminates hot spots on localized areas of the jacket, especially in the regions nearest the air tubes.

Fig. 6 clearly illustrates the difference in construction between the fins which are embedded in either the contact mass or the insulation material and the fins which are alined with and connected to fins of adjacent peripheral control tubes 26a. The indentations 45 on the fins 36 are of a depth sufficient to provide a substantial degree of free space between the indented portions and the unthreaded portion 43 of set-screw 44 when the connecting device is in assembled position, so that the tubes 26*a* and their associated fins 36 may expand freely without danger of binding in the connected portions.

From the foregoing, it is evident that the shell-like barrier or container constructed in accordance with the present invention, provides a highly efficient means for controlling temperatures in the marginal region of a fixed bed converter casing, so that the duty imposed upon the insulation jacket surrounding the contact mass is substantially diminished.

What I claim is:

1. In a converter including a reaction chamber adapted to contain a mass of solid contact material and a series of parallel perforated conduits extending into said chamber and embedded within the contact mass for supplying fluid reactants thereto and for removing fluid reaction products therefrom, a plurality of parallel heat-exchange tubes distributed symmetrically throughout and about said series of perforated conduits, and including a peripheral row of heat-exchange tubes surrounding said series of perforated conduits, said heat-exchange tubes being set at one end in a wall of said reaction chamber and being free to expand and contract longitudinally within said reaction chamber with changes in temperature, adjacent tubes of said row of peripheral heat-exchange tubes being removably connected along their sides to form a continuous envelope surrounding the remaining heat-exchange tubes and said series of perforated conduits and containing said contact mass, and insulating material between said continuous envelope of peripheral tubes and the wall of said reaction chamber.

2. A converter as defined in claim 1 in which said heat exchange tubes in said peripheral row are provided with radial fins disposed on the line of centers between adjacent peripheral tubes, and including connecting means for joining alined fins of adjacent tubes in said outer peripheral row to form said envelope for containing said contact mass, said connecting means being adapted to permit slight independent movement of each of said connected heat exchange tubes.

3. A converter as defined in claim 2 including additional fins on said connected heat exchange tubes in the peripheral row, some of said additional fins projecting inwardly into said mass of contact material and others projecting outwardly into said insulation material.

4. A converter as defined in claim 3 in which said alined fins of peripheral heat exchange tubes are laterally spaced, the spaces between alined fins of adjacent tubes being filled with a packing of insulation material adapted to provide with said connecting means a relatively flexible, substantially gas-tight joint.

5. In a converter providing a reaction chamber adapted to contain a mass of contact material and a symmetrically arranged pattern of fluid distributing and/or collecting tubes and heat exchange tubes, means for connecting adjacent heat exchange tubes in the outermost peripheral row comprising radially extending longitudinal fins disposed on the line of centers between adjacent tubes, adjacent alined fins being spaced to provide a longitudinal gap therebetween, a packing of insulation material in said gap, elongated flat bars disposed on either side of said alined fins completely covering said gap, and connecters extending freely through said gap and connecting said bars in a relatively loose fit, whereby the tubes of said peripheral row of heat exchange tubes are joined to form a continuous barrier adapted to contain said mass of contact material.

ROBERT M. SHIRK.

REFERENCES CITED

The following references are of record in the file of this patent:

UNITED STATES PATENTS

| Number | Name | Date |
|---|---|---|
| 2,276,356 | Velykis | Mar. 17, 1942 |
| 2,283,208 | Houdry et al. | May 19, 1942 |
| 2,376,629 | Stanfield et al. | May 22, 1945 |